No. 752,763. PATENTED FEB. 23, 1904.
G. B. DONAVIN, H. E. STEIN & O. D. HUNT.
CART.
APPLICATION FILED SEPT. 29, 1903.
NO MODEL.
2 SHEETS—SHEET 1.

Witnesses:
Jas E Hutchinson
H. E. Montague

Inventors:
G. B. Donavin,
H. E. Stein, and
O. D. Hunt,
By Bacon Milans
Attorney

No. 752,763. PATENTED FEB. 23, 1904.
G. B. DONAVIN, H. E. STEIN & O. D. HUNT.
CART.
APPLICATION FILED SEPT. 29, 1903.
NO MODEL. 2 SHEETS—SHEET 2.
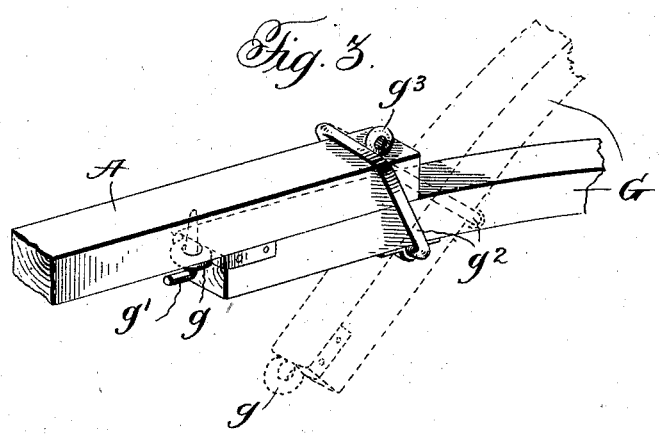
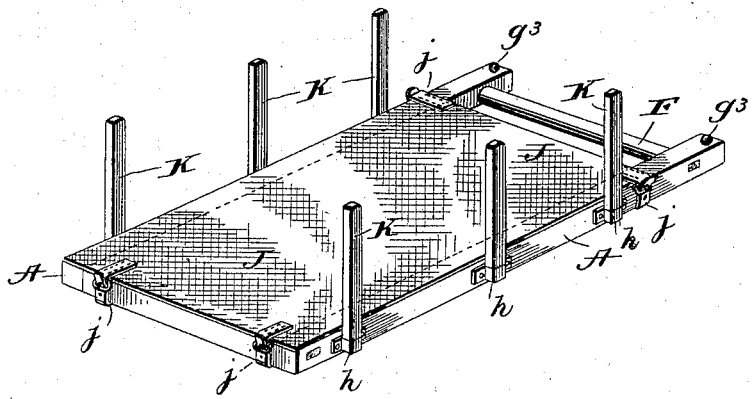

No. 752,763. Patented February 23, 1904.

UNITED STATES PATENT OFFICE.

GEORGE B. DONAVIN, HENRY E. STEIN, AND OLIVER D. HUNT, OF COLUMBUS, OHIO, ASSIGNORS TO THE GEORGE B. DONAVIN & COMPANY, OF COLUMBUS, OHIO.

CART.

SPECIFICATION forming part of Letters Patent No. 752,763, dated February 23, 1904.

Application filed September 29, 1903. Serial No. 175,063. (No model.)

*To all whom it may concern:*

Be it known that we, GEORGE B. DONAVIN, HENRY E. STEIN, and OLIVER D. HUNT, citizens of the United States, residing at Columbus, in the county of Franklin and State of Ohio, have invented certain new and useful Improvements in Carts, of which the following is a specification, reference being had therein to the accompanying drawings.

This invention relates to a novel type of cart designed, primarily, for army purposes, but of course susceptible of utilization for any other purpose for which the peculiarities of the cart render the same useful, its abundant facilities for convertibility, however, rendering the same especially prominent as an army implement.

The invention contemplates the provision of a cart having instrumentalities whereby the same may be converted from one form of vehicle into a variety of other forms, so that a single cart may at different times serve as a special conveyance for performing certain definite functions. For instance, the same cart may be employed for transporting wares, as an ambulance for moving the sick, as a mortuary cart, as a soldier or other passenger conveyance, &c.

The novel details in the construction and arrangement of the several parts of the improved cart will be apparent from the detailed description hereinafter, when read in connection with the accompanying drawings, forming a part hereof, and wherein a convenient embodiment of the invention is illustrated. It is, however, to be understood that in any future interpretation as to the scope of the present invention the same is in no sense to be limited to any special features of construction herein disclosed except in so far as the same may be specifically included in the hereto-appended claims, as such disclosure is made simply for the purpose of facilitating the impartation of a clear understanding of the invention.

Figure 1:
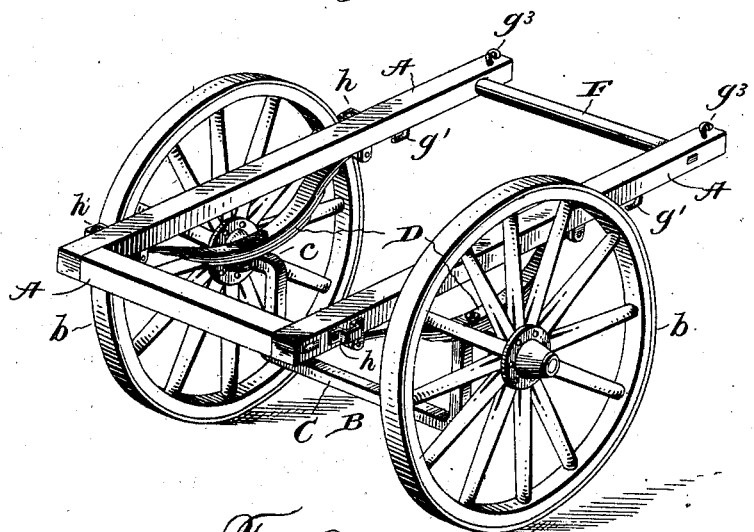
Figure 2:
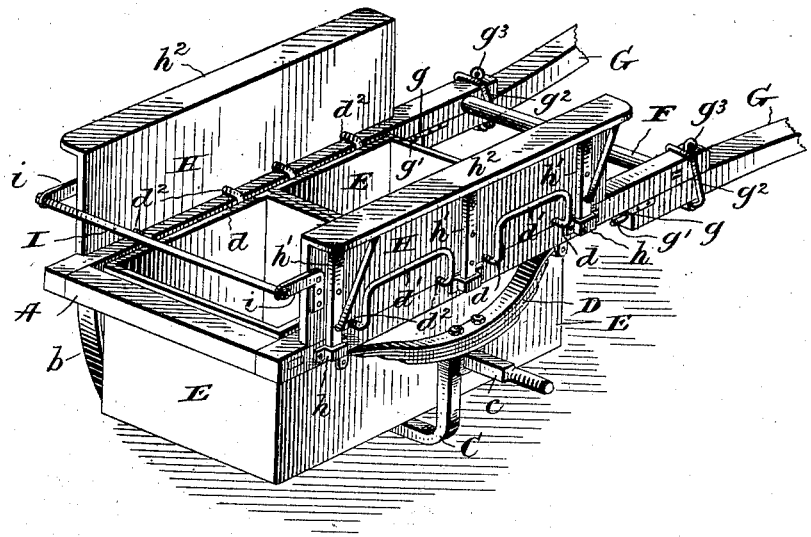

In the drawings, Figure 1 is a perspective view of the cart with its detachable features removed. Fig. 2 is a similar view showing the side-boards and tanks or receptacles in place upon the cart-frame. Fig. 3 is a detail perspective view showing the means for attaching a tongue to the cart-handles. Fig. 4 is a perspective view of the cart-frame, showing posts or standards fitted thereto in lieu of the side-boards shown in Fig. 2 and also showing a canvas stretched across said frame, the tanks or receptacles being removed.

Referring more specifically to the drawings, wherein like reference characters refer to corresponding parts in the several views, A designates an open frame of substantially rectangular configuration, supported upon a truck B, consisting of the wheels $b$, an axle C, connecting the same and springs D, interposed between the side bars of the frame A and said axle. The axle is provided with stub portions $c$ immediately adjoining the wheels, and it is upon said stub portions that the bottoms of the springs D rest. Intermediate said stub portions the axle is dropped for a considerable extent. This provides for the reception of the bottom or receptacle E, depending from the frame A and supported thereon by the offset handles $b$, overlying the upper edges of the frame.

The forward end of the frame is provided with a round or cross bar F, constituting a handle when the device is used as a hand-cart, the side bars of the frame, however, extending forwardly slightly beyond said cross-bar to provide for the attachment of tongues G. It is desirable that these tongues be readily attached or removed, and to this end each tongue is provided with an eye $g$, adapted to engage over a hook $g'$ on the bottom of the adjacent side bar of the frame, and also with a pivoted link $g^2$, arranged to engage over a hook or projection $g^3$ on the upper surface of said side bar. To attach the tongues, it is simply necessary to slip the link $g^2$ over the hook $g^3$, with the tongue slightly elevated, (see dotted lines, Fig. 3,) then turn the inner end of the tongue under, when the same may be slid inwardly until the eye $g$ has engaged the hook $g'$. The reverse operation will remove the tongue.

The handles or supporting members $d$ of the receptacles constituting the bottom of the cart may be flat or they may terminate in upward extensions $d'$.

At the outside of the respective sides of the frame are rigidly secured a series of standard supports or brackets $h$, into which the ends of standards $h'$ on side-boards H may be removably inserted, said side-boards being provided with outwardly-turned flanges $h^2$ at their upper edges to constitute seats when the cart is used as a passenger-vehicle. The side-boards are reinforced by a brace-rod I, connecting their rear ends, said brace-rod passing through and being bolted to alined ears $i$ on said side-boards. The lower edges of the side-boards are cut away, as at $d^2$, to permit the passage therethrough of the handles $d$ on the receptacles E.

As shown in Fig. 4, the side-boards H and the bottom E may be removed and in their stead a canvas J may be secured to the frame by means of the straps $j$ engaging therearound, when the cart may be used as an ambulance, or the standards K may be fitted in the sockets or brackets $h$, when the device may be employed as a mortuary cart, the bodies being placed upon the canvas bottom and stacked between the said standards K.

From the foregoing it will be appreciated that our cart may be made very light and strong and that the same possesses many novel features which enable its speedy conversion into a plurality of formations whereby its adoption for an exceptionally large number of uses is augmented.

Having thus described the invention, what is claimed as new, and desired to be secured by Letters Patent, is—

1. A cart comprising an open frame, a wheeled truck therefor having a dropped axle, a receptacle having offset handles overlying the upper edge of the sides of the frame for supporting the same in a suspended position between the sides thereof and within said dropped portion of the axle.

2. A cart comprising an open frame, a wheeled truck therefor having a dropped axle, a receptacle having offset handles overlying the upper edge of the sides of the frame for supporting the same in a suspended position between the sides thereof and within said dropped portion of the axle, in combination with springs interposed between the sides of said frame and the end portions of the axle.

3. A cart comprising an open frame, a removable bottom portion suspending therefrom, in combination with side-boards projecting upwardly from the sides of said frame.

4. A cart comprising an open frame, a removable bottom portion suspending therefrom, in combination with removable side-boards projecting upwardly from the sides of said frame.

5. A cart comprising an open frame, a removable bottom portion suspending therefrom, in combination with removable side-boards projecting upwardly from the sides of said frame, said side-boards having outwardly-projecting flanges at their upper edges constituting seats.

6. A cart comprising an open frame, a removable bottom portion suspending therefrom, in combination with removable side-boards projecting upwardly from the sides of said frame, and means for connecting the ends of said side-boards to reinforce the same.

7. A cart comprising an open frame, a removable bottom portion suspending therefrom, in combination with removable side-boards projecting upwardly from the sides of said frame, said side-boards having outwardly-projecting flanges at their upper edges, and means for connecting the ends of said side-boards to reinforce the same.

8. A cart comprising an open frame, a wheeled truck therefor, a removable bottom portion provided with handles overlying the upper edges of the sides of said frame to suspend said bottom portion, and removable side-boards projecting upwardly from said sides of the frame, said side-boards being cut away to accommodate the handles of said bottom portion.

9. A cart comprising a continuous substantially rectangular frame having oppositely-disposed parallel sides and a normally open bottom, in combination with a wheel-truck therefor, a receptacle removably supported upon said frame and suspended between the sides thereof, and removable side-boards projecting upwardly from the sides of said frame, said side-boards having outwardly-projecting flanges at their upper edges constituting seats.

In testimony whereof we affix our signatures in presence of two witnesses.

GEORGE B. DONAVIN.
HENRY E. STEIN.
OLIVER D. HUNT.

Witnesses:
JOHN F. FERGUS,
MARY A. EVANS.